United States Patent [19]

Farrey

[11] Patent Number: 4,550,863
[45] Date of Patent: Nov. 5, 1985

[54] FOAM GUN FOR MIXING AND DISPENSING TWO REACTANTS

[75] Inventor: Merlyn F. Farrey, Akron, Ohio

[73] Assignee: Fomo Products, Inc., Akron, Ohio

[21] Appl. No.: 507,973

[22] Filed: Jun. 27, 1983

[51] Int. Cl.$^4$ ............................................. B67D 5/60
[52] U.S. Cl. ................................... 222/145; 222/153; 222/509; 74/526; 239/404; 239/414
[58] Field of Search ............... 222/135, 145, 190, 505, 222/509, 510, 153; 137/625.4; 422/133; 239/414, 433, 583; 74/526

[56] References Cited

U.S. PATENT DOCUMENTS

| | | | |
|---|---|---|---|
| 1,515,081 | 11/1924 | Toelle | 74/526 |
| 2,937,813 | 5/1960 | Rinkewich | 239/583 |
| 3,096,001 | 7/1963 | Boe et al. | 222/135 |
| 3,139,692 | 7/1964 | Sellers et al. | 124/40 |
| 3,633,795 | 1/1972 | Brooks | 222/135 |
| 3,784,110 | 1/1974 | Brooks | 239/414 |
| 3,920,188 | 11/1975 | Price | 239/414 |
| 4,083,474 | 4/1978 | Waite et al. | 222/474 |
| 4,311,254 | 1/1982 | Harding | 222/145 |
| 4,333,608 | 6/1982 | Hendry | 239/583 |
| 4,344,919 | 8/1982 | Kelterbaum | 422/133 |
| 4,399,930 | 8/1983 | Harding | 251/241 |

Primary Examiner—Joseph J. Rolla
Assistant Examiner—Andrew Jones
Attorney, Agent, or Firm—Mack D. Cook, II

[57] ABSTRACT

A dispensing gun to deliver at point-of-use chemically reactive constituents or foam reactants in a predetermined volumetric ratio. The foam reactants are prepackaged within pressurized containers connected to the gun through supply tubing. The dispensing gun has as its principal components: a body with a barrel, bore and pistol grip; a squeezable trigger housed in the pistol grip; a reactant supply and mixing component adjacent the front end of the bore; a reciprocating valve rod within the bore actuated by the trigger; and a bias means normally closing supply ports in the reactant supply and mixing component, and moving the trigger rearwardly of the pistol grip.

1 Claim, 5 Drawing Figures

FOAM GUN FOR MIXING AND DISPENSING TWO REACTANTS

BACKGROUND OF THE INVENTION

Dispensing guns for reactive constitutents to produce urethane foam and the like are known in the prior art.

U.S. Pat. No. 3,633,795, 1/1972, Brooks discloses a portable dispenser apparatus connected by lengths of tubing to a pair of pressurized containers. The dispenser comprises a manually graspable support bracket, a pair of tiltable valve elements, a valve supporting assembly and a dispensing nozzle. The valve supporting assembly attaches the dispensing valve to the bracket and includes a housing portion and a pair of rearwardly extending inlet members for connecting to the tubing. The bracket has a trigger which actuates the tiltable valve elements in unison.

U.S. Pat. No. 3,784,110, 1/1974, Brooks discloses a foam dispensing gun with a housing, a handle affixed to the housing, dual valves for controlling the flow of foam components through the gun, tubing lengths between valves and supply containers, and a manually operable trigger on the housing for controlling the valves. A removable dispensing nozzle, secured by a latch within the housing, is structured so that all the fluid component mixing activity is confined to the nozzle means interior.

U.S. Pat. No. 4,311,254, 1/1982, Harding is an improvement over Brooks II in providing improved elements for mounting and holding a disposable nozzle.

A dispensing gun according to the invention is primarily intended for use in the industrial or commercial installation or application of urethane foam, with the reactants or constituents being supplied from large pressurized containers or tanks. Primary components of the gun are fabricated from engineered state of the art plastics, providing for reliability of operation and lower cost. At the end of a work day or upon completion of an insulation project, the gun may be either discarded or cleaned for reuse.

SUMMARY OF THE INVENTION

The object of the invention is to provide an improved dispensing gun, hand held, to precisely and safely deliver at point-of-use chemically reactive constituents or foam reactants in a predetermined volumetric ratio.

A further object of the invention is to provide a dispensing gun for two component polyurethane foam. The two foam components are pre-packaged in pressurized and valved dual containers. The formulation may also include surfactants to stabilize the emulsion, blowing agents, fire retardants and catalysts.

Still further, it is an object of the invention to provide a dispensing gun which may be mass-produced using engineered state-of-the art plastics and commercially available and economical molding processes; a dispensing gun which is capable of reuse when cleaned, but of such low cost as to be disposable after use.

These and other objects of the invention and further advantages thereof, will be apparent in view of the detailed description and drawings.

In general, a dispensing gun for multi-component foam reactants according to the invention has as the primary or body component an upper barrel with a longitudinal bore and a pistol grip below the barrel. The front end of the bore is adapted to carry a replaceable dispensing nozzle. The rear wall of the barrel has an opening coaxial with the bore. The rear side of the pistol grip has opposed rearwardly directed flanges defining a vertical slot for housing a squeezable trigger. A trigger component has a rearwardly projecting lower portion, a medial portion pivotally mounted at the upper end of the pistol grip vertical slot and an upper portion alignable with the rear wall of the barrel. A reactant supply and mixing component is positioned adjacent the front end of the barrel bore. This component has a cylindrical sleeve with a plurality of ports for the supply of foam reactants to the front end of the barrel bore. Each supply port extends through a coupling stud for connection thereof to a length of flexible tubing extending to a remote container for a foam reactant. A reciprocating valve rod component is positioned coaxially within the barrel bore and has a rear end projecting through the opening in the rear wall of the barrel for connection to the upper portion of the trigger. The front end of the rod carries an elongate valve element having an outer diameter coincident with the inner diameter of the sleeve and a length sufficient to selectively open or close the supply ports. a bias means, such as a compression spring positioned within the barrel bore coaxially around the valve rod and in seating engagement with the valve element, urges the valve element into the sleeve to normally close the supply ports while purging the seeeve of foam reactants, and to move the lower trigger portion rearwardly of the pistol grip.

Another feature of a dispensing gun according to the invention is a safety lock flange on the upper end of the trigger and a rearwardly directed resilient lock member carried on the upper rear portion of the barrel normally positioned to engage the trigger safety lock flange when the reciprocating rod valve element is positioned to close the sleeve ports.

Still other features are that the reactant supply and mixing sleeve component at the front end of the barrel bore may have internal threads for attachment of a dispensing nozzle; and a ring bushing is positioned at the rear of the valve rod and in contact with the trigger component for stabilizing the concentricity of the reciprocating valve rod within the barrel bore.

Yet another feature is that the upper portion of the trigger component has a yoke opening to receive the rear end of the reciprocating valve rod which is retained in operative engagement with the trigger by a clip fastener.

Another feature of the reactant supply and mixing component is that the interior end of a supply port is both tapered and offset from the axis of the sleeve to create a venturi effect and promote mixing of foam reactants.

THE DRAWINGS

DETAILED DESCRIPTION OF THE INVENTION

Figure 1:
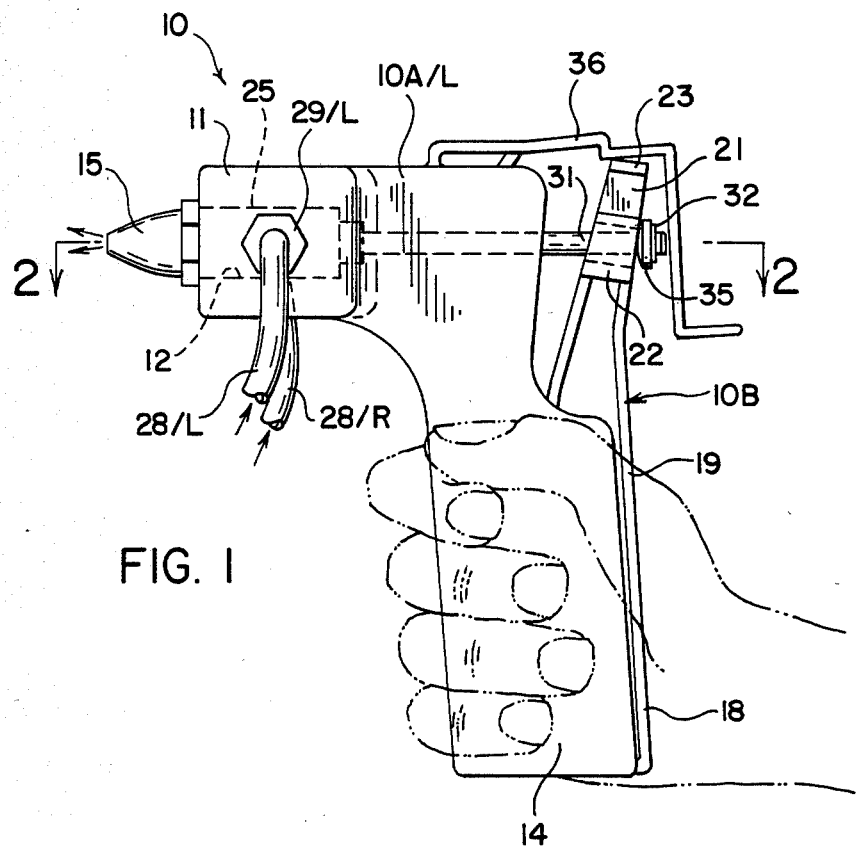
FIG. 1 is a side view of a dispensing gun according to the invention in the hand of an operator.

A dispensing gun according to the invention is referred to generally by the numeral 10. The primary or body component is indicated at 10A.

A body component 10A is preferably molded from a suitable engineered rigid plastic, in two mating or complementary halves; a left half, 10A/L, and a right half, 10A/R. After assembly and fastening of the halves together, using state of the art adhesives, a component 10A has an upper barrel 11 with a longitudinal bore 12 and a pistol grip 14 below the barrel 11. The front end of the bore 12 is adapted to carry a replaceable dispensing nozzle 15. The rear wall of the barrel 11 has an opening 16 coaxial with the bore 12. The rear side of the pistol grip 14 has opposed rearwardly directed flanges 17/L and 17/R defining a vertical slot for housing a lower portion of a squeezable trigger component 10B.

A trigger component 10B is preferably molded from a suitable engineered rigid plastic, in one piece. A trigger 10B has a rearwardly projecting lower portion 18. A medial trigger portion 19 is pivotally mounted, as at 20, at the upper end of the vertical slot defined by the pistol grip flanges, 17/L and 17/R. An upper trigger portion 21 is alignable with the rear wall of the body barrel 11. As shown, the trigger portion 21 may have a yoke 22 defining an opening alignable with the barrel opening 16. Also as shown, above the yoke 22 the trigger portion 21 may terminate in a safety lock flange 23.

A reactant supply and mixing sleeve component 10C is preferably molded from a suitable engineered rigid plastic, in one piece. During assembly of the body halves 10A/L and 10A/R, the sleeve component 10C is positioned adjacent the enlarged diameter front end of the bore 12, for communication with the nozzle 15. As shown, each body half 10A has a side opening, 24/L or 24/R.

The cylindrical sleeve 25 of component 10C has a plurality of ports for the supply of foam reactants from conventional separate pressurized fluid components (not shown). As shown, there are two supply ports, 26/L and 26/R. Each supply port 26 extends axially through a coupling stud, 27/L or 27/R, projecting laterally through a body side opening, 24/L or 24/R. Each coupling stud 27 may have external threads for connection of a supply port 26 to a length of flexible tubing, 28/L or 28/R, by a known rotatable fastener, 29/L or 29/R. Each length of tubing 28 extends to a conventional pressurized fluid component (not shown) for supply of a foam reactant.

Figure 2:
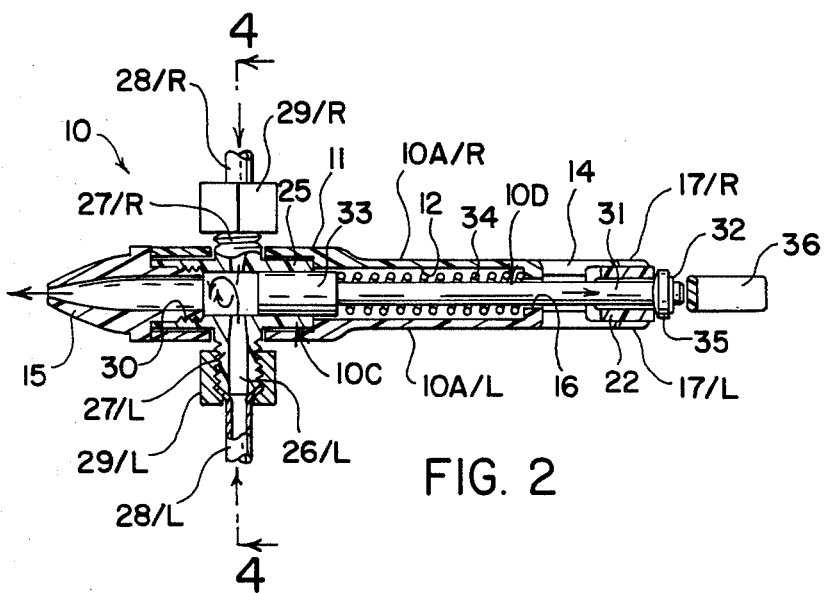
FIG. 2 is a top view in section, taken substantially as indicated on line 2—2 of FIG. 1.
Figure 3:
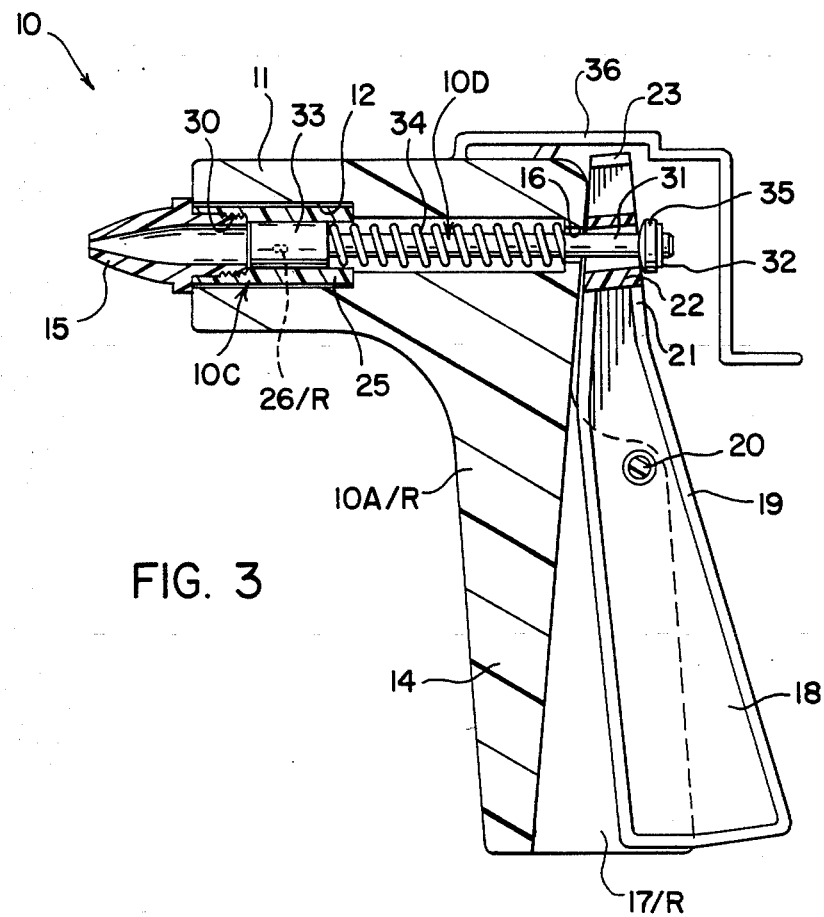
FIG. 3 is a sectional view showing the dispensing gun in a passive or non-operating condition.
Figure 4:
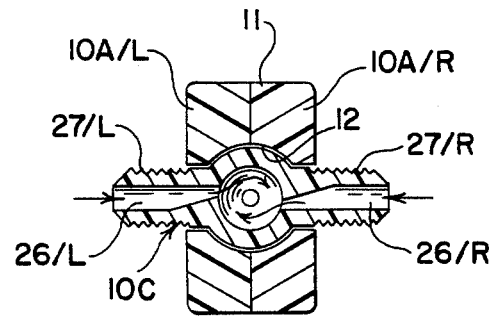
FIG. 4 is an enlarged sectional view, taken substantially as indicated on line 4—4 of FIG. 2.
Figure 5:
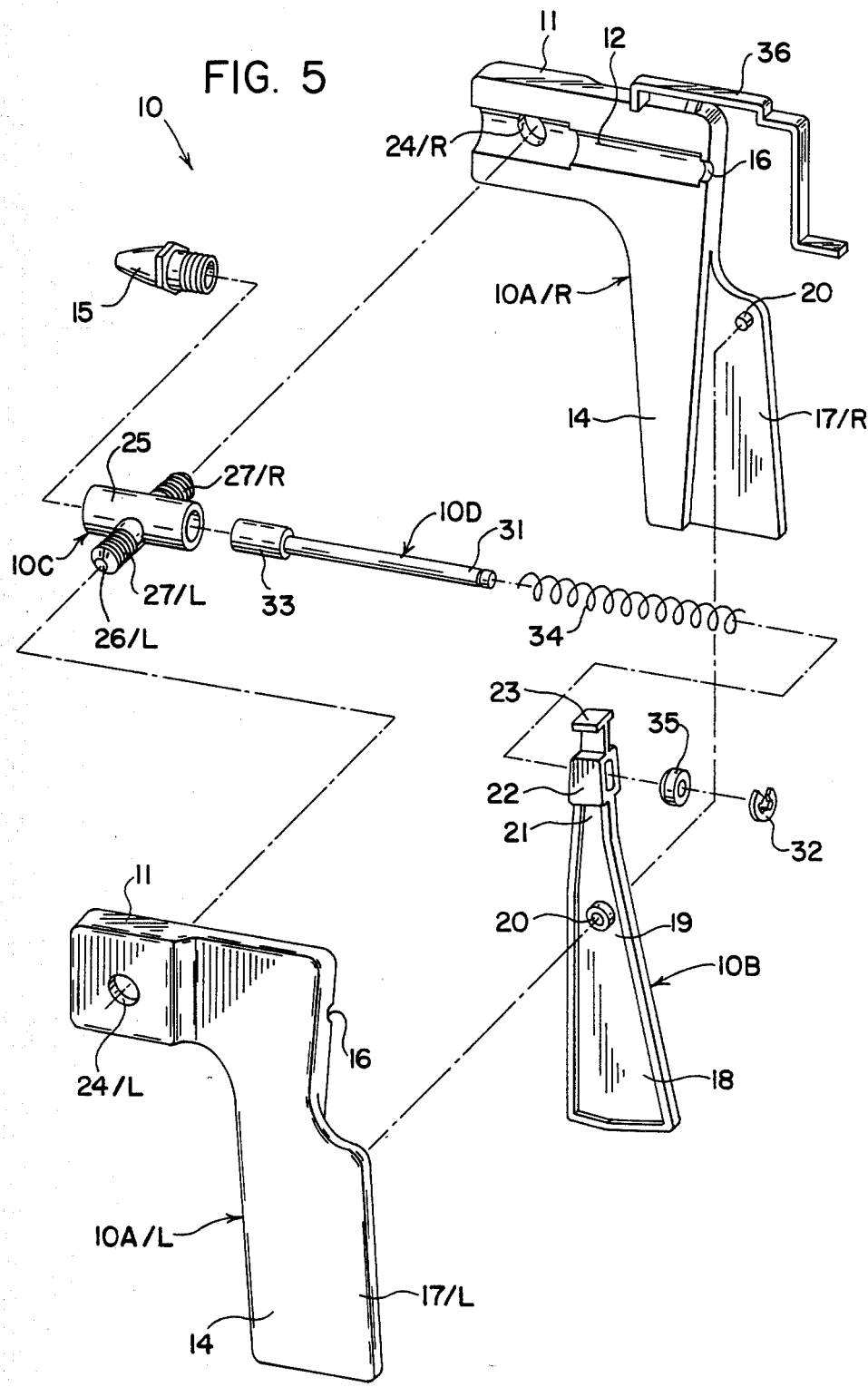
FIG. 5 is an exploded view showing the various components of a dispensing gun according to the invention.

As shown in FIGS. 2 or 3, the sleeve 25 of component 10C may have internal threads 30 for attachment of a dispensing nozzle 15. As shown in FIGS. 2 and 4, the interior end of each supply port 26 is both tapered and offset from the axis or center line of a sleeve 25 to create a metering and a venturi effect and promote mixing of the foam reactants supplied from tubing 28, before discharge through the nozzle 15.

Component 10D is a reciprocating valve rod positioned coaxially within the barrel bore 12 during assembly of the body halves 10A. The valve rod 10D, preferably of metal, has a rear end 31 projecting through the opening 16 in the rear wall of the barrel 11. As shown, the valve rod rear end 31 further projects through the opening in yoke 22 on the upper portion of the trigger 10B. The valve rod 10D is connected to the trigger 10B, as by a known clip fastener 32. The front end of the valve rod 10D carries an elongate valve element 33 having an outer diameter coincident with the inner diameter of the sleeve 25 of component 10C. The length of a valve element 33 is sufficient to open or close the supply ports 26. As shown, a compression spring 34 is positioned within the barrel bore 12 around the valve rod 10D and in pressure seating engagement with the valve element 33. The spring 34 functions as a bias means to urge the valve element 33 into the sleeve 25 and normally close the supply ports 26, while purging the sleeve 25 of foam reactants and to move the trigger portion 18 rearwardly of the pistol grip 14. Also as shown, a ring bushing 35 may be mounted around the rod end 31 between the upper portion 21 of the trigger component 10B and the retaining clip 32 to stabilize the concentricity of the valve rod 10D within the barrel bore 12.

An alternative component of a dispensing gun 10 is a rearwardly directed resilient lock member 36 carried on the upper rear portion of the barrel 11. As shown in FIG. 3, the lock member 36 is normally positioned to engage the trigger safety lock flange 23 when the reciprocating rod valve element 33 is positioned to close the sleeve ports 26. As shown in FIG. 1, the user of a dispensing gun may manually raise the lock member 36, disengaging the lock flange 23, so that squeezing of the trigger 10B will move the valve element 33 to open the sleeve ports, as shown in FIG. 2.

What is claimed is:

1. A dispensing gun adapted to be connected to separate pressurized fluid components for the supply of foam reactants, comprising: a body component having an upper barrel with a longitudinal bore and a pistol grip below the barrel, said barrel having a rear wall with an opening coaxial with said bore, said barrel further having an upper rear portion carrying a rearwardly directed resilient lock member, said pistol grip having opposed rearwardly directed flanges defining a vertical slot for housing a squeezable trigger; a trigger component having a rearwardly projecting lower portion, a medial portion pivotally mounted at the upper end of said pistol grip vertical slot and an upper portion alignable with said rear wall of the barrel said upper portion having a safety lock flange; a reactant supply and mixing component positioned adjacent the front end of said barrel bore and having a sleeve with a plurality of ports for the supply of foam reactants, each said supply port extending through a coupling stud for connection thereof to length of flexible tubing extending to a remote container for a foam reactant; a reciprocating valve rod component positioned coaxially within said opening in said rear wall of the barrel for connection to said upper portion of the trigger component, the front end of said rod carrying an elongate valve element having an outer diameter coincident with the inner diameter of said sleeve so as to open or close said supply ports and to purge said sleeve of foam reactants; there further being bias means to urge said valve element into said sleeve to normally close said supply ports while purging said sleeve and to move said lower trigger portion rearwardly of said pistol grip, said lock member on said barrel being normally positioned to engage said safety lock flange on said trigger component when said valve element is positioned to close said supply ports.

* * * * *